United States Patent [19]
Michal et al.

[11] Patent Number: 6,025,915
[45] Date of Patent: Feb. 15, 2000

[54] SCALE FACTOR STABILIZATION OF A BROADBAND FIBER SOURCE USED IN FIBER OPTIC GYROSCOPES IN RADIATION ENVIRONMENTS

[75] Inventors: Ronald J. Michal, Wrightwood; Leo K. Lam, Calabasas; David M. Rozelle, Woodland Hills, all of Calif.

[73] Assignee: Litton Systems, Inc., Woodland Hills, Calif.

[21] Appl. No.: 09/104,496

[22] Filed: Jun. 25, 1998

[51] Int. Cl.⁷ .................................................. G01C 19/72
[52] U.S. Cl. .............................................................. 356/350
[58] Field of Search ................................... 356/350, 345; 372/1, 6; 385/12, 14, 27, 37

[56] References Cited

U.S. PATENT DOCUMENTS

| | | | |
|---|---|---|---|
| 4,938,556 | 7/1990 | Digonnet et al. | 372/6 |
| 5,108,183 | 4/1992 | Fling et al. | 356/350 |
| 5,231,465 | 7/1993 | Huang et al. | 356/350 |
| 5,638,473 | 6/1997 | Byron | 385/37 |

*Primary Examiner*—Samuel A. Turner
*Attorney, Agent, or Firm*—Price, Gess & Ubell

[57] ABSTRACT

A system for performing scale factor stabilization of a broadband optical signal source used in fiber optic gyroscopes in radiation environments. An optical signal source is provided comprising a pump light source and an optical fiber arranged to receive pump light from the pump light source. Light output from the optical fiber is input into a wavelength division multiplexer. An optical gain fiber having an erbium-doped core is connected to the wavelength division multiplexer and arranged to be optically pumped by the pump light such that the gain fiber emits broadband light that propagates to the wavelength division multiplexer. An output optical fiber is connected to the wavelength division multiplexer and arranged to guide a portion of the broadband light emitted by the gain fiber to a fiber optic gyroscope. A filter device is positioned in-line with the broadband light emitted by the gain fiber to attenuate light outside of the bandwidth of the filter device. The filter device allows a bandwidth of light narrower than the spectral width of the broadband light source to propagate through while attenuating all wavelengths of light outside of its operating bandwidth. Only the portion of the broadband source spectrum contained within the bandpass of the filter is selected out, thus narrowing the spectral width of the broadband fiber source. This narrower spectral width reduces the shift of centroid wavelength of the broadband fiber source which results when the gain fiber and other sensitive optical components are exposed to ionizing radiation.

15 Claims, 9 Drawing Sheets

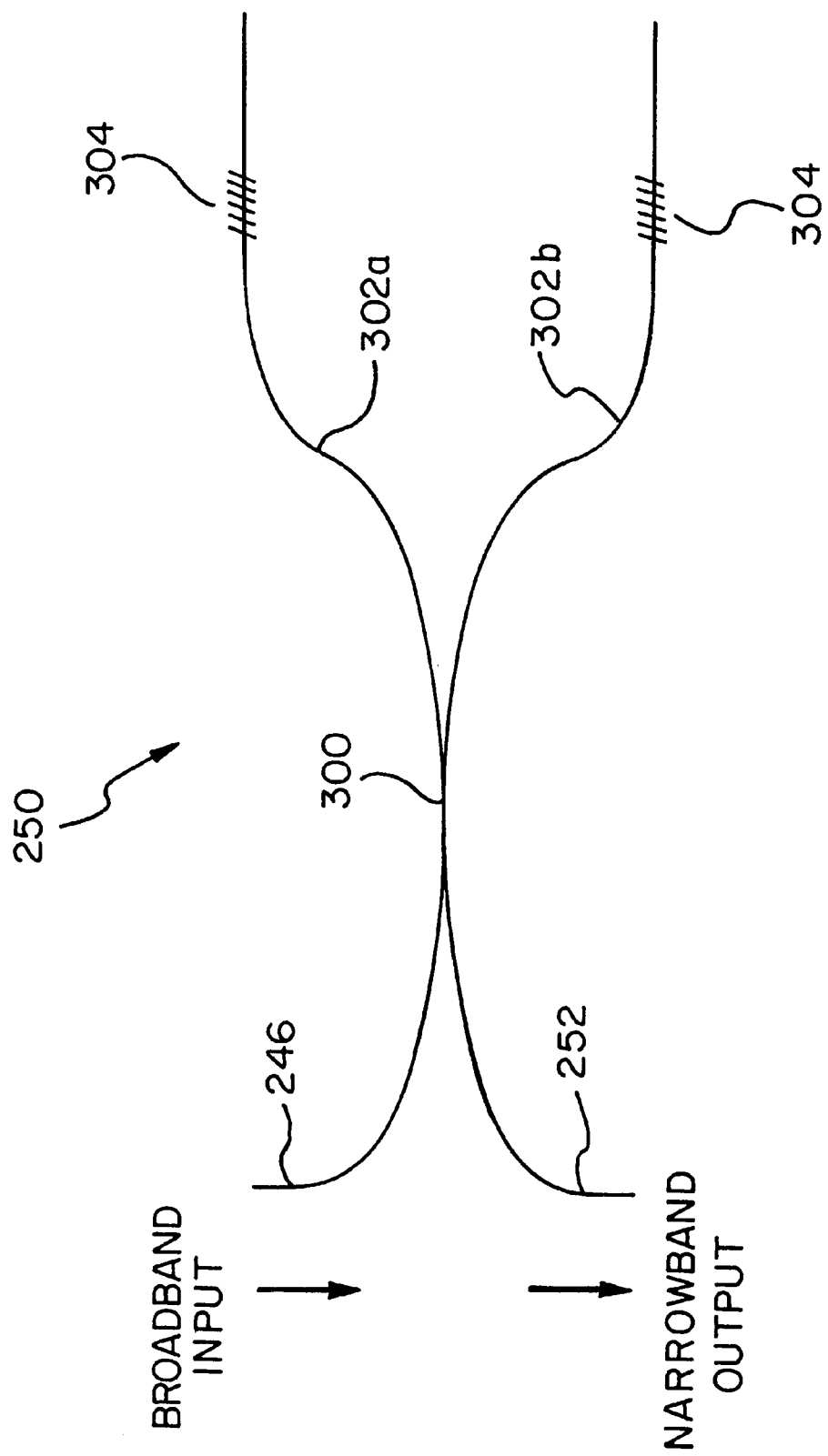

SCALE FACTOR STABILIZATION OF A BROADBAND FIBER SOURCE USED IN FIBER OPTIC GYROSCOPES IN RADIATION ENVIRONMENTS

BACKGROUND OF THE INVENTION

1. Field of the Invention

The present invention relates generally to an optical signal source for a fiber optic interferometric sensor, and specifically to a broadband optical signal source for a fiber optic gyroscope. The present invention provides an apparatus for stabilizing the scale factor of the light coming from the broadband fiber source in radiation environments.

2. Description of Related Art

Many fiber optic gyroscopes use a broadband fiber source to provide the light that is introduced into a fiber sensing coil for detecting rotation of the gyros. The typical broadband fiber source used in fiber optic gyros is a reverse pump, single-pass fiber source 100. Such a configuration is shown in FIG. 1. This configuration uses a pump light source 102, such as a pump laser diode, that emits light at a given wavelength which is directed through a wavelength division multiplexer (WDM) 104 that has two input leads and two output leads. One of the output leads 106 of the WDM 104 is physically connected to a length of erbium doped fiber (EDF) 108 via a splice 107. The EDF 108 is terminated at one end with a polished angle capillary tube 110 that keeps the light from being reflected back into the EDF 108.

The EDF 108 has a core that has been doped with one or more of the rare earth family of elements, such as erbium, which generates a light source by introducing an excitation signal into the EDF which in turn causes the fiber to emit a light characteristic of the dopant. When an erbium doped fiber is supplied with a source of energy being pumped into the fiber, such as for example a wavelength of 1480 nm generated by the pump laser diode 102, the electrons in the erbium absorb the energy and jump to a higher energy state. This energy may later be released as coherent laser light emitted in both directions of the EDF 108. When erbium is pumped with a laser at the appropriate wavelength, it emits a light in the 1525 to 1565 nanometer (nm) wavelength. The forward directed light exits the EDF 108 through the angled capillary 110 in such a way that it cannot be reflected back into the EDF 108, and this light is lost to the system.

The light emitted in the reverse direction is directed back towards the WDM 104. This light is at a different wavelength from the light introduced by the pump laser diode 102. The WDM 104 is optimized to separate the two wavelengths, where the light from the EDF 108 is at a wavelength such that it gets coupled into the fiber leg 112 that is not connected to the pump laser diode 102. This light, which is broadband in nature, is then coupled into the fiber optic gyro 114. In the fiber optic gyro 114, the light passes from a fiber optic coupler 117 used as a multiplexer (MUX) through a multifunction integrated optics chip 116, which forms and processes counter-propagating waves used in fiber optic rotation sensor systems. The counter-propagating waves are input into a fiber optic sensing coil 118. A phase shift between the counter-propagating waves develops as a result of rotating the fiber optic sensing coil 118. The light in the sensing coil 118 provides phase information which can be related to the gyro rotation rate through a term called scale factor. The scale factor is linearly related to the average wavelength of the light coming from the broadband fiber source 100. A typical spectrum for the broadband light source 100 described above is shown in FIG. 2.

Because of the broad spectral width of this light source, the scale factor becomes related to the weighted average of the spectrum, otherwise referred to as the centroid wavelength. It has been shown that when the erbium doped fiber 108 (and to a lesser degree the other fiber optic components, such as the sensing coil 118) is exposed to a source of ionizing radiation, a large shift in the centroid wavelength occurs, thus causing a large scale factor error. FIGS. 3 and 4 illustrate an example of this centroid wavelength shift occurring in a test performed on a double-pass EDF 108 having a length of 8 meters. The double-pass EDF 108 uses a mirror instead of an angle capillary tube 110 to reflect the emitted light from the far end of the erbium doped fiber 108. FIG. 3 shows the pre-exposure spectrum of the broadband fiber source and FIG. 4 shows the spectrum after the EDF has been exposed to gamma radiation with a strategic level dose.

The spectrum from a broadband light source is made up of a composite of several emission peaks. As the radiation damages the EDF 108, the different emission peaks experience different levels of attenuation. This has the effect of shifting the centroid wavelength. In FIG. 3, the emission peak which is prominent is centered at 1560 nanometers. As the radiation damages the fiber, the 1560 nanometer peak is attenuated more than the peak which is near 1534 nanometers. The 1534 nanometer peak becomes noticeable in FIG. 4. The centroid wavelength for these two cases shifts from 1558.628 nanometers in FIG. 3 to 1556.974 nanometers in FIG. 4. This corresponds to a scale factor shift of 1061 parts per million. For high accuracy fiber optic gyroscopes, this creates an unacceptable level of error. There is a need for stabilization of the scale factor of a broadband fiber source used in fiber optic gyros when exposed to ionizing radiation. Moreover, there is a need for an apparatus which provides scale factor stabilization of a broadband fiber source by minimizing the centroid wavelength shift of the spectrum of the broadband fiber source when exposed to ionizing radiation.

OBJECTS AND SUMMARY OF THE INVENTION

It is a primary object of the present invention to overcome the aforementioned shortcomings associated with the prior art.

Another object of the present invention is to provide a system for stabilizing the scale factor of a broadband fiber source used in fiber optic gyros when exposed to ionizing radiation.

Yet another object of the present invention is to provide a system for providing scale factor stabilization of a broadband fiber source by minimizing the centroid wavelength shift of the spectrum of the broadband fiber source when exposed to ionizing radiation.

Still another object of the present invention is to provide a scale factor stabilization system for a broadband fiber source which minimizes the centroid wavelength shift when the broadband fiber source is exposed to radiation by reducing the spectral width of the broadband fiber source.

These as well as additional objects and advantages of the present invention are achieved by providing a system for performing scale factor stabilization of a broadband optical signal source used in fiber optic gyroscopes. An optical signal source is provided comprising a pump light source and an optical fiber arranged to receive pump light from the pump light source. Light output from the optical fiber is input into a wavelength division multiplexer. A gain fiber is connected to the wavelength division multiplexer and arranged to be optically pumped by the pump light such that the gain fiber emits broadband light that propagates to the wavelength division multiplexer. The gain fiber preferably comprises a length of optical fiber having a core doped with erbium. An output optical fiber is connected to the wavelength division multiplexer and arranged to guide a portion of the light emitted by the gain fiber to a fiber optic gyroscope.

A fiber optic filter device is positioned in-line with the light emitted by the gain fiber to attenuate light outside of the bandwidth of the filter device. The fiber optic filter device may be positioned at various locations within the gyro architecture. The filter device is preferably a fiber optic bandpass filter that allows a bandwidth of light narrower than the spectral width of the broadband light source to propagate through while attenuating all light outside of its operating bandwidth. Only the portion of the broadband source spectrum contained within the bandpass of the filter is selected out, thus narrowing the spectral width of the broadband fiber source. This narrower spectral width reduces the centroid wavelength shift which results when the EDF is exposed to ionizing radiation.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings in which the reference numerals designate like parts throughout the figures thereof and wherein:

FIGS. 7A–7C are schematic illustrations of possible embodiments of the bandpass filter used in the scale factor stabilization system of the present invention;

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a scale factor stabilization system for a broadband fiber source used in fiber optic gyroscopes in radiation environments.

Figure 5:
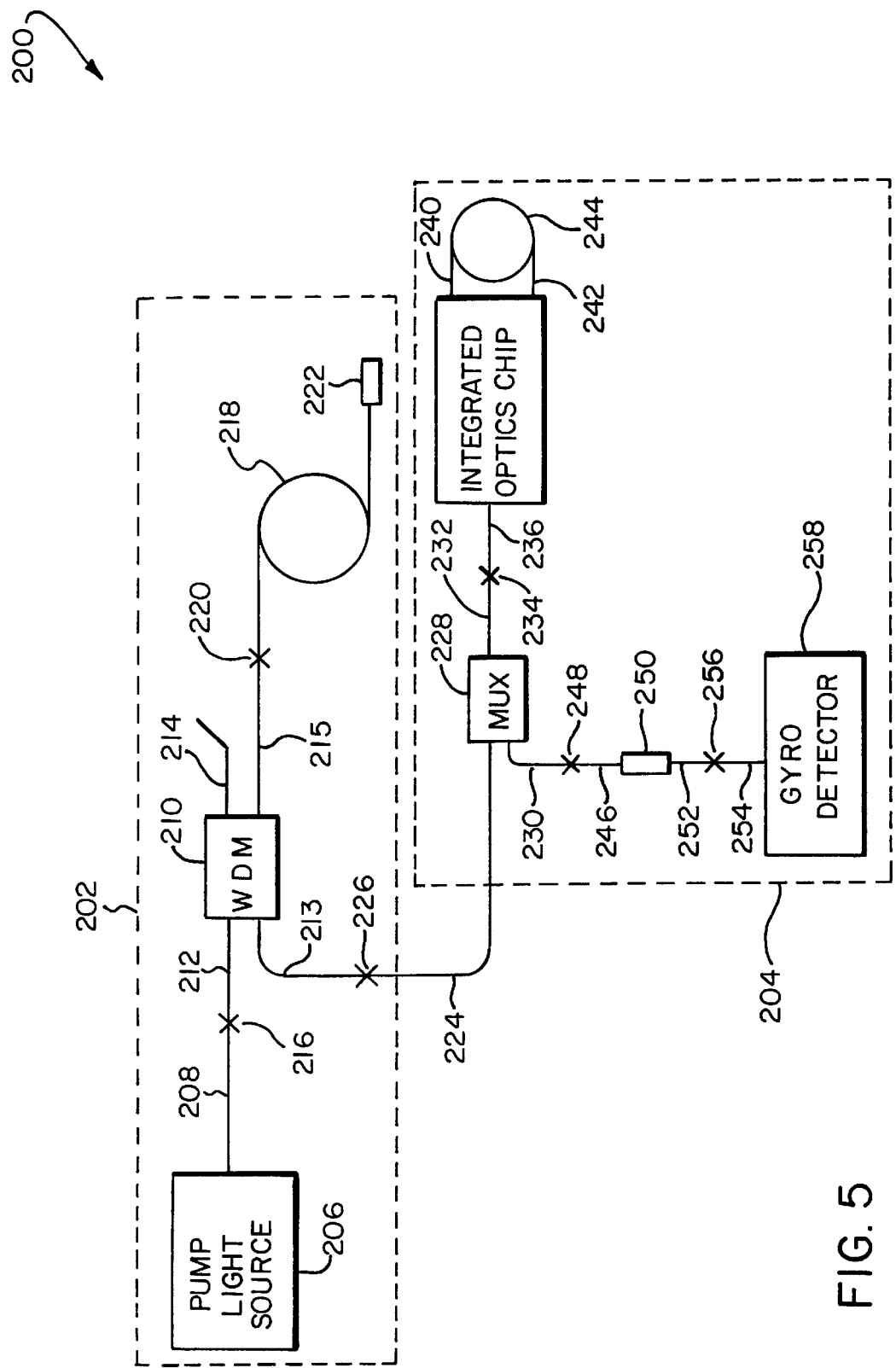
FIG. 5 is a schematic illustration of the scale factor stabilization system for a broadband fiber source used in fiber optic gyroscopes in radiation environments in accordance with a preferred embodiment of the present invention.

Referring now to FIG. 5, the scale factor stabilization system 200 for a broadband optical signal source 202 according to the present invention is illustrated. The optical signal source 202 is arranged to provide optical signals to a fiber optic rotation sensor 204, such as a gyroscope. The optical signal source 202 includes a pump light source 206, which preferably comprises a pump laser diode, arranged to provide pump light to an optical fiber 208.

A WDM coupler 210 has optical pigtails 212–215 extending therefrom. The pigtail 212 is connected to optical fiber 208 via a splice 216, so that the pump light propagates from the pump light source 206 to the WDM coupler 210. The WDM coupler 210 guides the pump light into a gain fiber 218 that is connected end-to-end with the optical fiber pigtail 215 via a splice 220.

The pump light source 206 preferably generates a pump light wavelength of approximately 1480 nm. The gain fiber 218 includes a core doped with erbium, which is well-known in the art. While erbium is described as the doping medium, it is understood that other elements of the rare earth family may be utilized for the doping medium. The erbium-doped gain fiber 218 has a three level transition that produces a broadband optical signal having a wavelength centered at 1560 nm. U.S. Pat. No. 5,231,465, issued Jul. 27, 1993 to Huang et al. and U.S. Pat. No. 5,119,229 issued Jun. 2, 1992 to Grasso et al. disclose the use of erbium-doped cores to provide an optical signal in an optical fiber. The disclosures of U.S. Pat. Nos. 5,231,465 and 5,119,229 are hereby incorporated by reference into this disclosure.

The gain fiber 218 absorbs part of the pump light and emits light propagating lengthwise in both directions in the gain fiber. Light emitted in the direction of propagation of the pump light is referred to as forward light. Light emitted by the gain fiber 218 in the direction opposite to the direction of propagation of the pump light is referred to as reverse light. The broadband optical signal source 202 may be formed with either a single-pass or double-pass gain fiber 218. When formed using a single-pass gain fiber 218, an angle capillary tube 222 is positioned at the end of the gain fiber 218 to prevent light from being reflected back into the fiber 218. When formed as a double-pass broadband fiber source, angle capillary tube 222 is replaced with a reflector to reflect the forward light back into gain fiber 218. Reflector 222 is preferably formed as a dichroic mirror, but may be a Bragg or long period fiber grating or a straight cleave on the end of the gain fiber 218. The reflector 222 causes the light emitted in the forward direction to be reflected back in the reverse direction, so that both the reverse light and the forward light are directed to the WDM coupler 210. The pump light does not reflect from the reflector 222 when a dichroic mirror is used.

The WDM coupler 210 directs the light emitted from the gain fiber 218 to the fiber optic gyroscope 204 via optical fiber 224 that is connected to optical pigtail 213 via splice 226. The light that the optical fiber 224 guides away from the WDM coupler 210 is the optical signal for the fiber optic gyroscope 204. The optical signal propagates to a multiplexer 228 connected to optical fiber 224. Multiplexer 228 further includes optical fiber pigtails 230 and 232. The optical signal from the optical signal source 202 then passes through multiplexer 228 to the optical fiber pigtail 232. A splice 234 connects optical pigtail 232 to a pigtail 236 extending from a multi-function integrated optics chip (MIOC) 238, which includes well-known components used to form and process the counter-propagating waves used in fiber optic rotation sensor systems. Suitable MIOC structures are disclosed in U.S. Pat. Nos. 4,915,503 (Pavlath), 4,997,282 (Pavlath), and 5,037,205 (Pavlath), all of which are assigned to Litton Systems, Inc. The disclosures of U.S. Pat. Nos. 4,915,503, 4,997,282, and 5,037,205 are incorporated by reference into this disclosure.

The MIOC 238 is connected to a pair of optical fibers 240 and 242, which connect the MIOC 238 to a fiber optic sensing coil 244. The MIOC 238 processes light input from the optical signal source to provide counter-propagating waves to the fiber optic sensing coil 244. Rotation of the fiber optic gyroscope 204 about a line perpendicular to the plane of the sensing coil 244 produces a phase difference in the counter-propagating waves by means of the Sagnac effect. After traversing the sensing coil 244, the counter-propagating waves combine in the MIOC 238 and form an interference pattern. The combined counter-propagating waves then exit the MIOC 238 and enter the multiplexer 228. The optical fiber pigtail 230 of the multiplexer then guides the combined waves to an optical fiber 246 connected to pigtail 230 via a splice 248. The optical fiber 246 then guides the combined counter-propagating waves to a fiber optic bandpass filter 250 where all wavelengths of light outside of the bandwidth of the bandpass filter 250 are attenuated. The filtered optical signal exits bandpass filter 250 via an optical fiber 252 that is connected via splice 256 to an optical pigtail 254, which guides the filtered optical signal to a photodetector 258. The photodetector 258 produces electrical signals that indicate the intensity of the interference pattern produced by combining the waves that have propagated through the sensing coil 244. Signal processing circuitry (not shown) then may be used to measure rotation of the gyro by relating the phase information in the interference pattern to the gyro rotation rate through the scale factor of the optical signal coming from the optical signal source 202.

Figure 6:
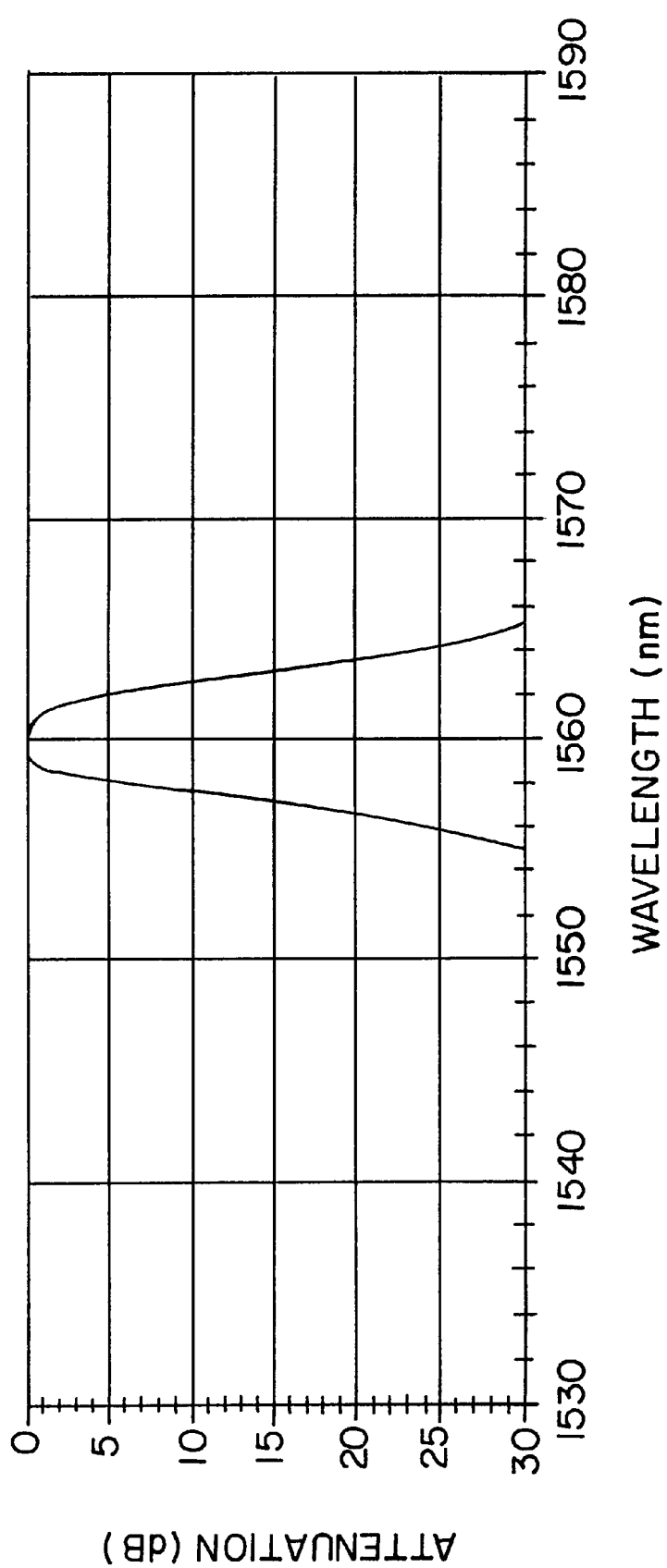
FIG. 6 is a graphical illustration of the attenuation characteristics of a narrow bandpass filter.

The bandpass filter 250 acts to reduce the centroid shift that results when the erbium doped gain fiber 218 and other sensitive optical components are exposed to ionizing radiation. The mechanization for accomplishing this reduction in the centroid shift is made possible by the wide bandwidth of the spectrum of the broadband optical signal source 202. The centroid wavelength is the weighted average of the broad spectrum of the optical signal source 202. The spectrum from a broadband light source is made up of a composite of several emission peaks. As the gain fiber 218 is exposed to ionizing radiation, the different emission peaks experience different levels of attenuation, resulting in a shift of the centroid wavelength. Other optical components can attenuate different wavelengths across the broadband spectrum when exposed to ionizing radiation. The bandpass filter 250 has the characteristic of attenuating light outside of its region of operation while allowing a bandwidth of light that is narrower than the spectral width of the broadband optical signal source 202 to propagate through. Thus, the filtered signal does not possess all of the emission peaks of the full spectrum of the optical signal source 202. The propagation/attenuation characteristics for a typical narrow band notch filter, such as notch filter 250, are illustrated in FIG. 6.

Figure 7B:
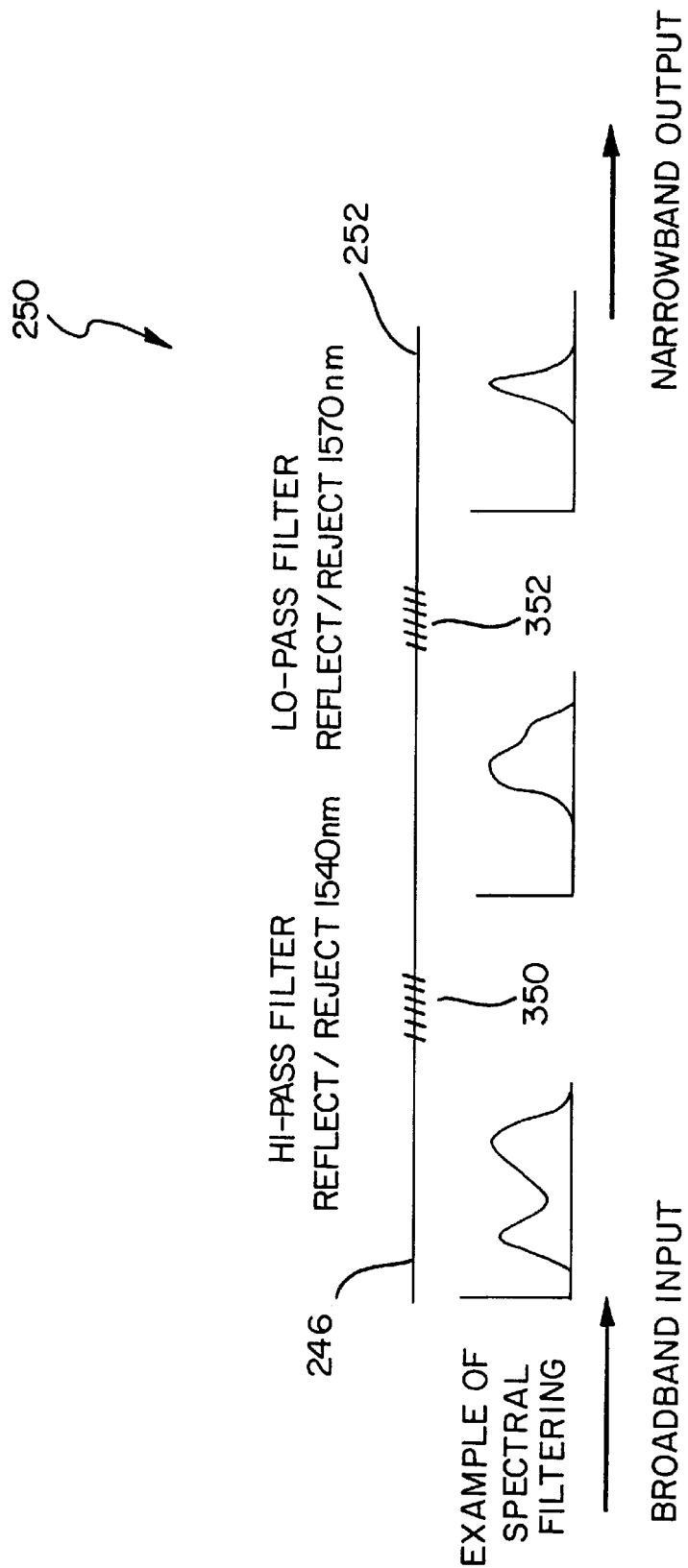
Figure 7C:
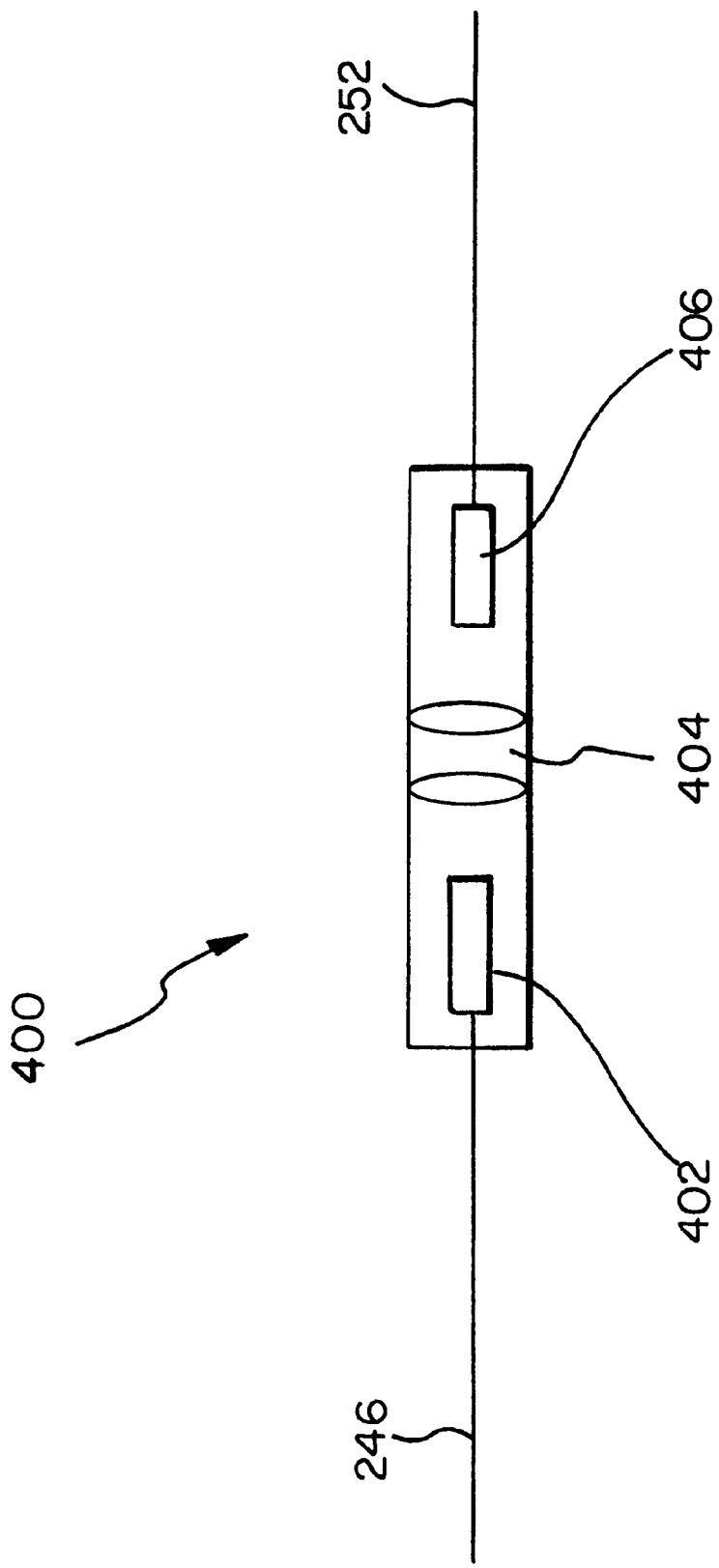

The bandpass filter 250 can be configured in many different ways. By way of example, several possible embodiments for implementing the bandpass filter 250 of the present invention are illustrated in FIGS. 7A–7C. These embodiments are described for illustrative purposes only and are not intended to encompass all possible embodiments for performing the bandpass filtering of the present invention. It is the full intention of the inventors of the present invention that the above-described bandpass filtering can be performed by any type of bandpass filter device conforming with the operation of the present invention.

One way to implement the bandpass filter 250 is to use a 2×2 coupler with matched Bragg gratings, as shown in FIG. 7A. Broadband light is directed into the bandpass filter 250 via fiber 246, where the light is directed towards a 2×2 fiber optic coupler 300. The fiber optic coupler 300 splits the light equally into two output leads 302*a* and 302*b*. Each of the output leads 302*a* and 302*b* has a Bragg grating 304 optically formed thereon. Within the Bragg gratings 304, the core of the optical fiber is exposed to intense ultraviolet light that is passed through a mask creating a periodic modulation pattern of the core index of refraction. This forms a grating pattern having the property of reflecting a specific wavelength of light incident upon it back through the core in the opposite direction. All other wavelengths are allowed to pass through the fiber grating unaffected. The unaffected light exits out of the two leads 302*a* and 302*b* without interfering with the operation of the fiber optic rotation sensor 204. The reflected light is directed back through the 2×2 coupler 300 and onto output fiber 252 where the reflected light exits the bandpass filter 250. This light is narrow band in nature with characteristics defined by the fiber Bragg gratings. This creates a bandpass filter 250 that allows only a narrow band of light from the broadband spectrum to propagate through to the fiber optic rotation sensor 204.

FIG. 7B illustrates another possible embodiment of the bandpass filter 250 formed using a pair of Bragg gratings or long period fiber gratings to provide a filter comprising only optical fiber components. Two segments of optical fiber with a different periodicity grating are optically etched into the fiber to form the gratings. When using Bragg gratings, light of a specific wavelength is reflected back through the core of the fiber, while when using long period fiber gratings, light of a specific wavelength is allowed to pass through with all other wavelengths being scattered in the cladding region of the fiber. One of the gratings 350 would have a periodicity that would allow higher wavelengths of light down to a value (e.g., 1540 nanometers) to propagate while reflecting or scattering out higher wavelength light into the cladding of the fiber. The second grating 352 would allow lower wavelengths of light up to a value (e.g., 1570 nanometers) to propagate while reflecting or scattering out lower wavelengths. This creates a bandpass filter 250 which takes a broadband input and only allows a narrow band of light from 1540 nm to 1570 nm to propagate while attenuating all other wavelengths.

Referring now to FIG. 7C, yet another possible embodiment for the bandpass filter 250 is illustrated using a bulk optic interference filter 400. Optical fiber 246 is used to input the broadband light into the bulk optic interference filter 400. The optical fiber 246 includes a graded indexed lens 402 for collimating the light. The collimated light is passed through at least one interference filter 404 which causes light of specific wavelength to interfere constructively. All other wavelengths of light interfere destructively, so that only the light interfering constructively passes through the interference filter 404. This light is then coupled into the output fiber lead 252 by a graded indexed lens 406. Only light in the desired narrow band of wavelengths interfering constructively are output to the gyro photodetector 258.

It is the utilization of a bandpass filter 250 in conjunction with a fiber optic gyroscope 204 which provides the novel means for reducing the shift of the centroid wavelength of the broadband optical signal source 202 spectrum, where any type of bandpass filter 250 may be utilized to provide this desired result. By placing the bandpass filter 250 in-line with the optical signal from the optical signal source 202 in the gyro architecture, it is possible to select out only that portion of the broadband source spectrum that is contained within the bandpass of the filter 250. This will have the effect of narrowing the spectral width of the broadband optical signal source 202, which reduces the centroid shift of the broadband source spectrum when the erbium doped gain fiber 218 and other sensitive optical components are exposed to ionizing radiation by reducing the number of emission peaks affected by the radiation.

Figure 1:
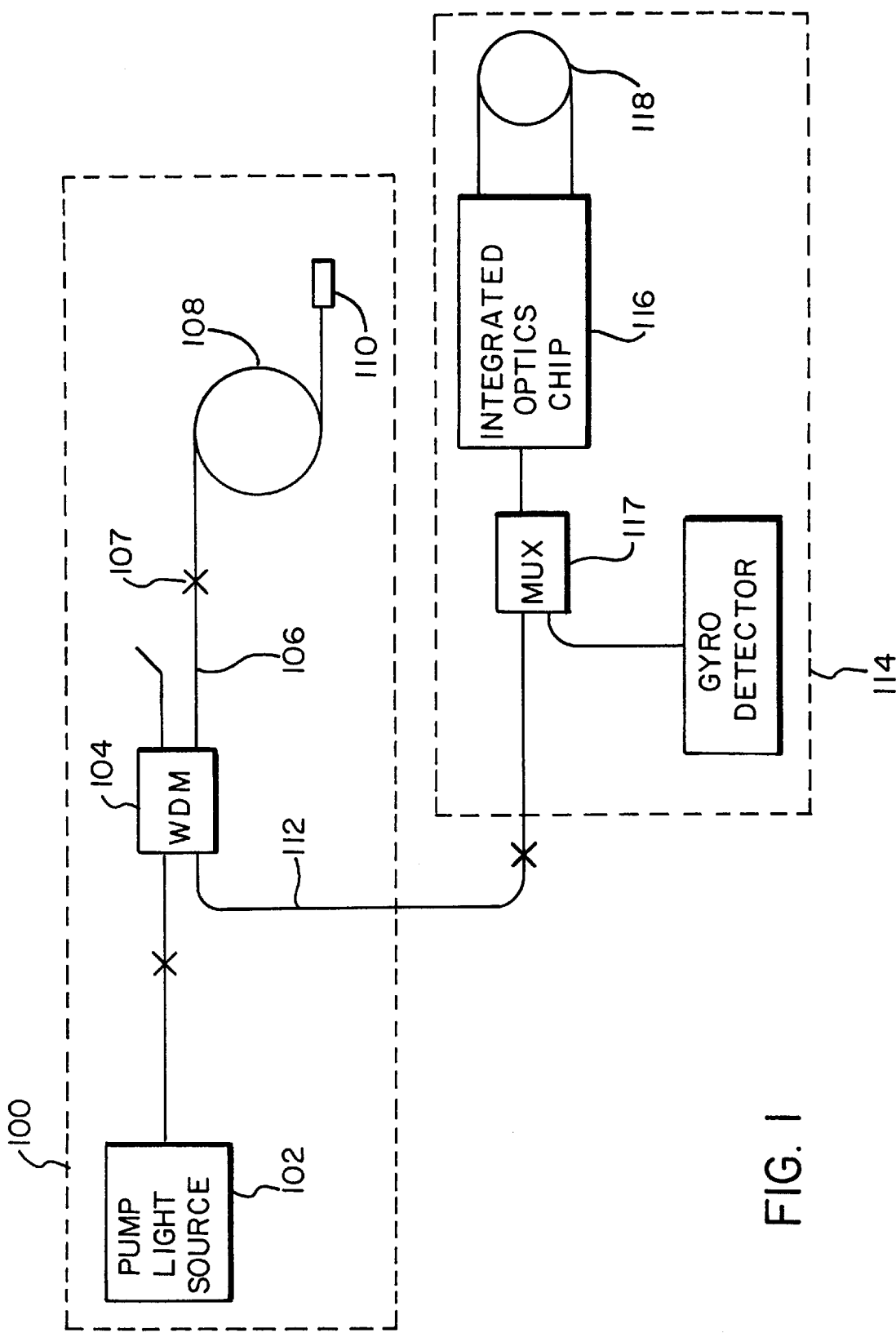
FIG. 1 is a schematic illustration of a typical fiber optic gyroscope architecture.
Figure 2:
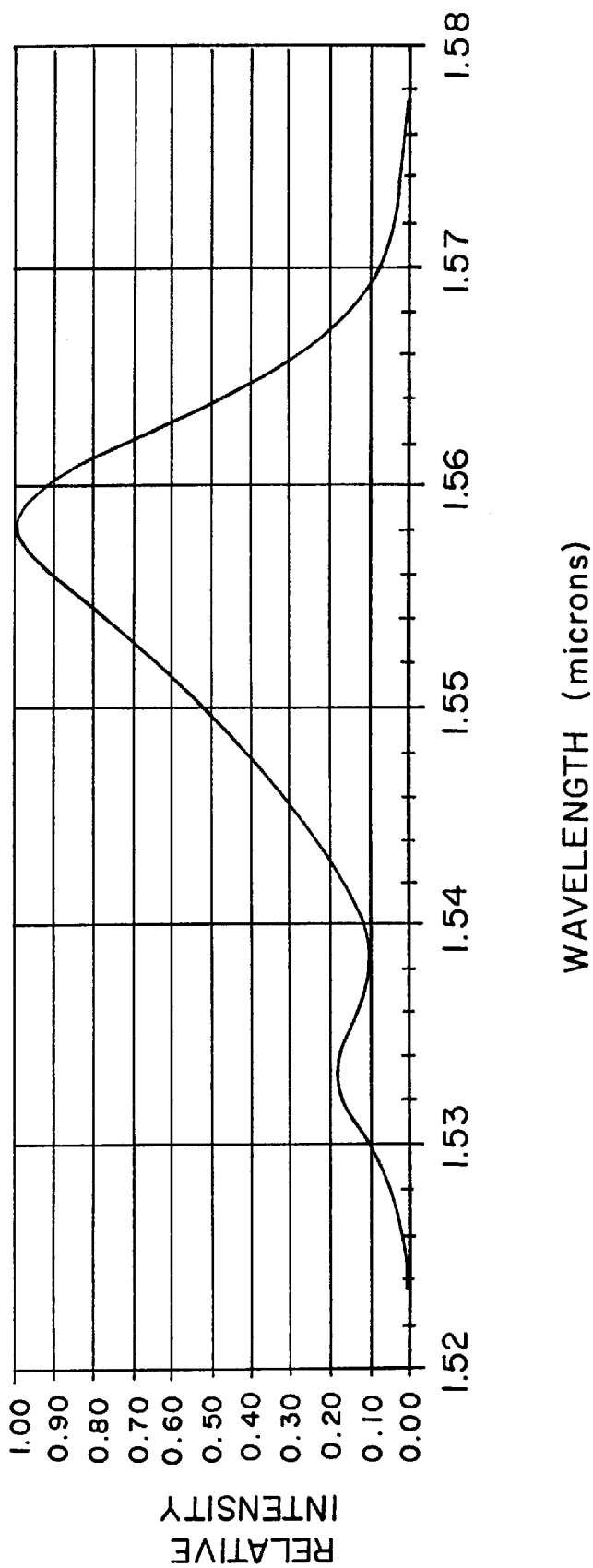
FIG. 2 is a graphical illustration of a typical spectrum for the broadband light source of FIG. 1.
Figure 3:
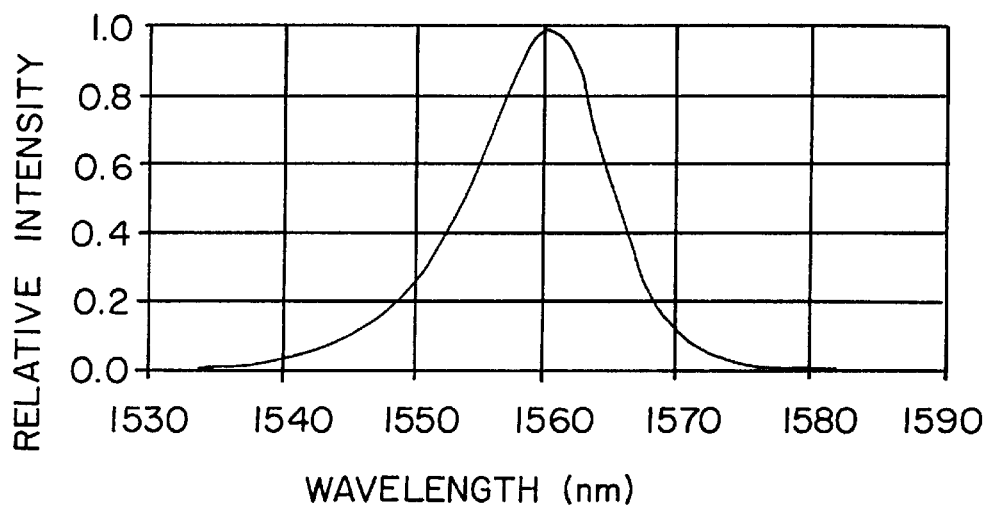
FIG. 3 is a graphical illustration of the spectrum of a light source emitted from a double pass erbium doped test fiber prior to exposure to ionizing radiation.
Figure 4:
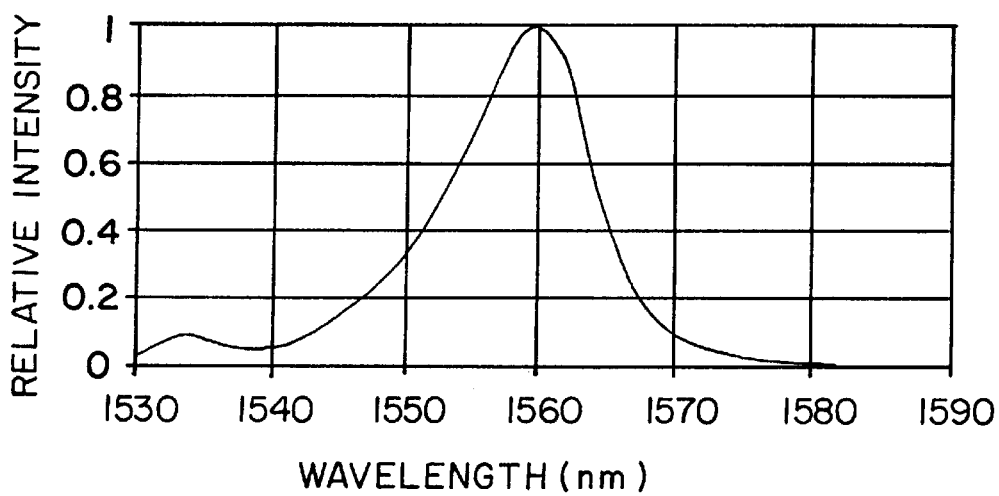
FIG. 4 is a graphical illustration of the spectrum of a light source emitted from the double pass erbium doped test fiber of FIG. 3 after being exposed to ionizing radiation of a strategic level dose.
Figure 8:
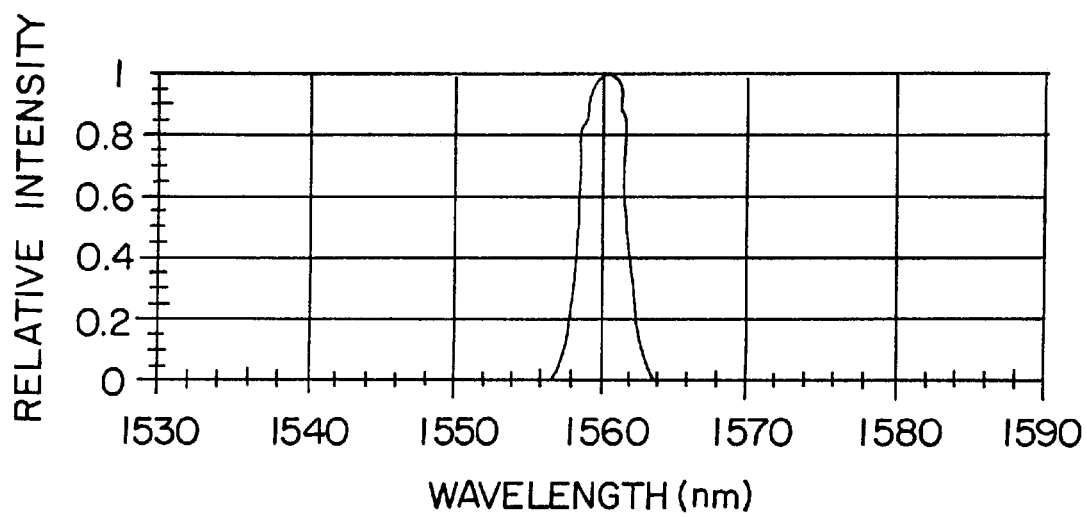
FIG. 8 is a graphical illustration of the spectrum of a light source emitted from the pre-exposure double pass erbium doped test fiber of FIG. 3 after a filter having the characteristics of FIG. 6 is applied thereto.
Figure 9:
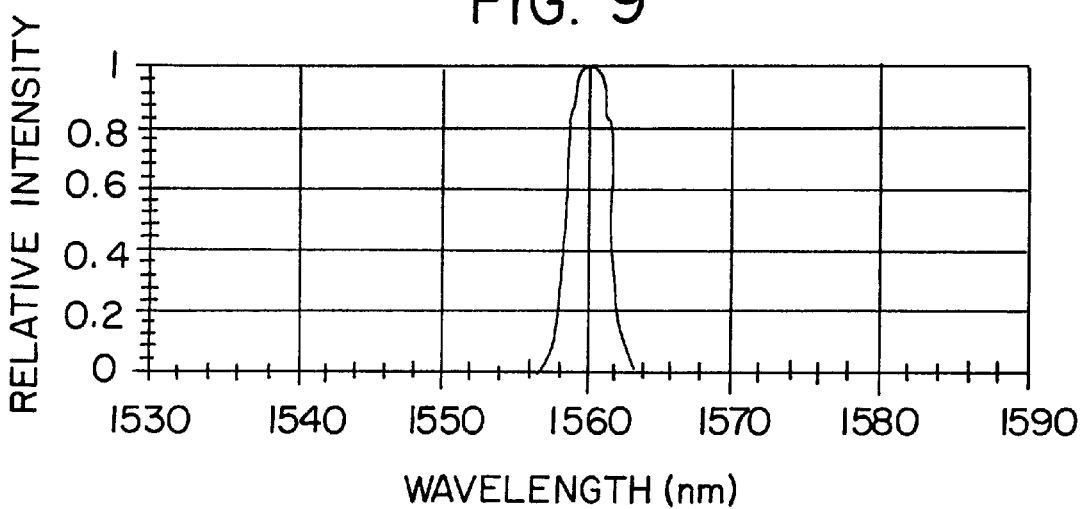
FIG. 9 is a graphical illustration of the spectrum of a light source emitted from the post-exposure double pass erbium doped test fiber of FIG. 4 after a filter having the characteristics of FIG. 6 is applied thereto.

When the bandpass filter 250 having the characteristics as shown in FIG. 6 is applied to the pre-ionization exposure spectrum and post-ionization exposure spectrum shown in FIGS. 3 and 4, respectively, the spectrums shown in FIGS. 8 and 9 are, respectively, achieved. The pre-exposure centroid wavelength of FIG. 8 was determined to be 1560.003 nm, while the post-exposure centroid wavelength of FIG. 9 was determined to be 1559.953 nm. This corresponds to a scale factor shift of 32 parts per million, which is a significant reduction when compared to the unfiltered shift of 1061 parts per million described above.

Aside from the embodiment of the present invention set forth in FIG. 5, it is also possible to position bandpass filter 250 in various other locations in the gyro architecture while achieving similar results in scale factor stabilization. For instance, bandpass filter 250 may alternatively be positioned in the leg of the multiplexer 228 connected to WDM 210, in the leg of the multiplexer 228 connected to MIOC 238, or in the leg of WDM 210 connected to erbium-doped gain fiber 218.

In another alternative embodiment of the scale factor stabilization system 200 for a broadband optical signal source 202 of the present invention, bandpass filter 250 could be removed from the scale factor stabilization system and replaced with a specially-coated dichroic mirror used for reflector 222. The optical coatings on the dichroic mirror 222 used to create a double pass broadband fiber light source would be selected such that the wavelengths of the emitted light would only include a narrow portion of the broadband optical signal source 202 spectrum, thus creating a spectrum similar to that described above exiting the bandpass filter 250. This approach would cause light having a narrow bandwidth.

As can be seen from the foregoing, a scale factor stabilization system for a broadband optical signal source used in fiber optic gyroscopes formed in accordance with the present invention will minimize the centroid wavelength shift of the broadband source spectrum when the broadband optical signal source and other sensitive optical components are exposed to ionizing radiation. Moreover, by forming a scale factor stabilization system for a broadband optical signal source used in fiber optic gyroscopes formed in accordance with the present invention, a more accurate gyroscope measurement can be achieved in radiation environments by providing a more stable scale factor for the broadband optical signal source.

In each of the above embodiments, the different structures of the scale factor stabilization system for a broadband optical signal source used in fiber optic gyroscopes of the present invention are described separately in each of the embodiments. However, it is the full intention of the inventors of the present invention that the separate aspects of each embodiment described herein may be combined with the other embodiments described herein. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A system for stabilizing the scale factor of a broadband optical fiber source used in fiber optic rotation sensors, comprising:
   a pump light source;
   a gain fiber optically pumped by the pump light to emit a broadband optical signal;
   a fiber optic rotation sensor receiving the broadband optical signal from the gain fiber and processing the broadband optical signal to determine the rotation of the rotation sensor by applying a scale factor linearly related to the weighed average wavelength of the broadband optical signal; and
   a bandpass filter having a bandpass width narrower than the spectral width of the broadband optical signal connected in the propagation path of the broadband optical signal from the gain fiber for attenuating light outside its bandpass width.

2. The system of claim 1, wherein the bandpass filter comprises a fiber optic bandpass filter which allows the propagation of wavelengths of light within its operating bandwidth while attenuating all wavelengths of light outside its operating bandwidth.

3. The system of claim 1, wherein the bandpass filter comprises an optical fiber situated between two fiber optic gratings, each of the gratings having a different periodicity so as to allow only wavelengths of light in a bandwidth between the periodicity of the gratings to propagate while attenuating all other wavelengths of light outside this bandwidth.

4. The system of claim 1, further comprising:
   a wavelength division multiplexer positioned between the pump light source and the gain fiber to pass the pump light to the gain fiber as well as receive the broadband optical signal from the gain fiber and pass it to the fiber optic rotation sensor.

5. The system of claim 4, further comprising a reflector connected to an end of the gain fiber to reflect light emitted by the gain fiber back into the gain fiber.

6. The system of claim 5, wherein the reflector is a dichroic mirror.

7. The system of claim 4, wherein the bandpass filter is positioned between the gain fiber and the wavelength division multiplexer.

8. The system of claim 4, wherein the bandpass filter is positioned between the wavelength division multiplexer and the fiber optic rotation sensor.

9. The system of claim 4, wherein the fiber optic rotation sensor further comprises:
   a multiplexer arranged to receive the broadband optical signal from the wavelength division multiplexer;
   an integrated optics device connected to the multiplexer for forming and processing counter-propagating waves from the broadband optical signal;
   a coil device connected to the integrated optics device for generating a phase difference in the counter-propagating waves in relation to the rotation of the fiber optic rotation sensor, wherein the counter-propagating waves are combined in the integrated optics device to generate an interference pattern; and a detector for detecting the interference pattern.

10. The system of claim 9, wherein the bandpass filter is positioned between the multiplexer and the detector.

11. The system of claim 9, wherein the bandpass filter is positioned between the multiplexer and the integrated optics device.

12. The system of claim 1, wherein the gain fiber comprises a length of optical fiber doped with erbium.

13. A method for stabilizing the scale factor of a broadband optical fiber source used in fiber optic rotation sensors, comprising the steps of:

optically pumping a gain fiber to emit a broadband optical signal;

guiding the broadband optical signal to a fiber optic rotation sensor; and filtering the broadband optical signal to narrow the spectral width of the broadband optical signal.

14. The method of claim 13, wherein the filtering step comprises attenuating all wavelengths of light outside a selected operating bandwidth which narrows the spectral width of the broadband optical signal.

15. The method of claim 13, further comprising the steps of:

forming counter-propagating waves from the broadband optical signal;

generating a phase difference in the counter-propagating waves in relation to the rotation of the fiber optic rotation sensor;

combining the counter-propagating waves to generate an interference pattern; and detecting the interference pattern as an indication of the rotation of the fiber optic sensor.

* * * * *